United States Patent [19]

Jensen

[11] 4,332,602
[45] Jun. 1, 1982

[54] FIN COOLER FOR GLASS FIBER FORMER

[75] Inventor: Thomas H. Jensen, Murrysville, Pa.

[73] Assignee: PPG Industries, Inc., Pittsburgh, Pa.

[21] Appl. No.: 193,195

[22] Filed: Oct. 2, 1980

[51] Int. Cl.³ .................................. C03B 37/025
[52] U.S. Cl. ............................. 65/12; 65/1; 65/2
[58] Field of Search ....................... 65/2, 1, 12

[56] References Cited
U.S. PATENT DOCUMENTS 2,908,036 10/1959 Russell .................................. 65/12
3,334,981 8/1967 Glaser .................................. 65/1

*Primary Examiner*—Robert L. Lindsay, Jr.
*Attorney, Agent, or Firm*—John E. Curley

[57] ABSTRACT

A fin cooler particularly suited for use with a high pressure glass fiber forming bushing is disclosed. The fin cooler is structured to provide support for the tip plate of the bushing so that sag or creep of the tip plate which occurs due to the pressure and temperatures at which the tip plate operates, is substantially reduced. The fin cooler is provided with a cooling water conduit and an air distribution chamber. The cooling water serves to remove heat from the fins during operation of the bushing and that air flow from the chamber may be used to provide cooling when the bushing is shut down, or as needed during operation, the air flow maintaining the attenuating zone i.e. the tip plate and surrounding area at a desired temperature.

6 Claims, 5 Drawing Figures

FIN COOLER FOR GLASS FIBER FORMER

FIELD OF THE INVENTION

The present invention is directed to a fin cooler for a glass fiber bushing. More particularly, the present invention is directed to a fin cooler which supports the tip plate of the bushing. Most specifically, the present invention is directed to a fin cooler for use with a high pressure bushing. The fin cooler is generally comprised of a manifold provided with air and water distribution means and with a plurality of fins which extend from the manifold and pass between adjacent rows of nozzles in a bushing tip plate. The fins may be a cantilever assembly or may extend between first and second similar manifolds. The fin cooler of the present invention contacts portions of the corrugated tip plate portion of a glass fiber forming bushing which is operating under high pressure and temperature. The fin cooler supports the tip plate thereby preventing sag and creep of the tip plate. The cooling liquid and gas supplied to the fin cooler maintain the attenuating zone at a desired temperature during operation and shut down of the bushing.

DESCRIPTION OF THE PRIOR ART

In the manufacture of glass fibers, the conventional practice is to draw multiple cones of glass from a plurality of orifices or tips located on the bottom of a container through which molten glass flows. The container is called a bushing and the orifices or nozzles are conventionally located at the bottom of the bushing so that glass can flow from the interior of the bushing through the orifices to be formed into thin streams of glass by gravity. The glass streams, as they flow through the orifices, are attenuated by gathering them into a strand at a gathering point and winding them on a conventional rotating cylindrical winder. In conventional practice, the glass flowing through the nozzles or orifices is cooled by means of a fin cooler comprised of a plurality of flat plate fins that are attached to a manifold through which cooling water is flowed. The flat plate-like fins are positioned adjacent the cones of glass as they exit the bushing orifices and remove heat from the glass as it forms into solid glass filaments. The heat picked up by the fins is then transmitted from the plate-like fin to the manifold member and withdrawn by heat exchange from the manifold to water flowing through a central cavity contained in the manifold.

A typical fin cooler utilized in industry today in the manufacture of fiber glass is described in U.S. Pat. No. 2,908,036. While the fin cooler assembly described in the aforementioned U.S. patent is satisfactory in providing adequate cooling of glass filaments during formation, some difficulties are encountered utilizing these fin coolers when a bushing position is shut down, for example, to doff a package. Doffing a package is the process wherein the glass strand which has been formed from a given bushing position is removed from the winding device because of a completion of a package thereon or an interruption in the operation. This doffing operation, of necessity, means that the bushing position must be discontinued in its operation until the package can be removed from the winder and a new package started on the winder.

When a bushing position is stopped and the bushing is allowed to "hang", it is common for the bushing to experience a rise in temperature. This is caused by the fact that the mass of glass coming through the orifice is now falling simply by gravity, i.e., it is no longer being assisted by the attenuation forces applied to the glass fibers by the winding operation. This increase in temperature results in changes in glass viscosity at the surface of the bushing. In order to compensate for the rising temperature of the bushing which is in a hanging position, it has been common practice in the industry to utilize temperature compensators on the bushing itself which, since it is normally electrically controlled, will reduce the temperature of the bushing by actuation of relay devices to supply less power to the bushing and thereby cool it. Utilization of the compensator requires that the bushing temperature be elevated once again when the bushing is wound into position by connecting the filaments to a winder. In utilizing the bushing compensators it is also a common problem during the winding of the filaments from a bushing after it has been stopped that streaking occurs for a period of time during the start-up operation, i.e., glass fibers of uneven diameter are formed by the mere gravity fall of the glass as it emanates from the tips of the bushing. Thus, it is advisable in stopping a position during a normal doff or during a breakout; i.e., when a filament or groups of filaments break during a forming operation, to provide some control of the bushing temperature without recourse to changing the electrical characteristics of the bushing.

As discussed in my co-pending patent application Ser. No. 193,194, filed Oct. 2, 1980, the use of pressure increasing means, such as a pump, to supply molten glass to the bushing at a raised pressure is being used to produce filaments. Since the bushing, and in particular the tip plate portion thereof, is maintained at a high temperature, it has been necessary to prevent the tip plate from becoming deformed. My co-pending application Ser. No. 193,206, filed Oct. 2, 1980, discloses a corrugated tip plate to prevent creep and deformation of the tip plate area. A fin cooler is disclosed as being placed adjacent the tip plate with the fins of the cooler helping to prevent creep or sag of the tip plate.

SUMMARY OF THE INVENTION

It is an object of the present invention to provide a fin cooler for a glass fiber forming assembly.

Another object of the present invention is to provide a fin cooler having means to maintain the bushing temperature when the bushing is not operating.

A further object of the present invention is to provide a fin cooler which utilizes both liquid and gaseous cooling means.

Still another object of the present invention is to provide a fin cooler which assists in supporting the tip plate of a bushing.

In accordance with the present invention a fin cooler assembly is provided which takes advantage of the normal fin cooler manifold and flat plate fins of the prior art and which also provides a method of conveniently supplying a cooling medium to the surface of the bushing plate on which the nozzles or tips are located whenever necessary such as during any period of time when the bushing is lying in a placid state; i.e., when it is not being utilized in a forming operation to produce strand.

A first embodiment of the fin cooler assembly of the present invention provides a manifold member having a fluid inlet and a fluid outlet to a first tubular conduit which carries a suitable heat transfer fluid such as water and which permits the free flow of water through the manifold. A chamber is also provided in the manifold and extends along its length. Means are provided to introduce a gaseous medium such as air into the chamber. A plurality of outlets are provided along the length of the chamber at fixed intervals to permit this gas which has been introduced into the chamber to pass from the chamber through the outlets. The outlets are spaced at fixed intervals approximately intermediate the flat plate fins and preferably near the upper surface of the fins which are attached to the exterior surface of the manifold. Means are also provided on the manifold for the insertion of the flat plate fins.

In a second preferred embodiment of a fin cooler in accordance with the present invention, two manifold members are spaced from each other in a horizontal plane and are connected by virtue of flat plate fin members which are connected to each of the manifolds. Each half of the manifold assembly is the mirror image of the other and is provided with a liquid coolant conduit having an inlet and an outlet so that cooling fluid can be passed into one side of a manifold member and removed from the other side. The fin cooler plates are spaced from each other at a fixed distance and are used to separate the first and second manifold members from each other. Each of the manifolds, in addition to containing the central cooling fluid conduit, contains a plurality of spaced orifices of fixed size that are in communication with a chamber located in the upper portion of the manifold member so that cooling gases such as air can be introduced into that chamber and passed through the orifices across the upper surfaces of the fin members utilized to join the two manifold members together. The fin cooler plate members themselves are provided with a plurality of projections on their upper surfaces which are designed to contact the bushing member with which the fin cooler will be associated during operation.

BRIEF DESCRIPTION OF THE DRAWINGS

While the novel features of the fin cooler in accordance with the present invention are set forth with particularity in the appended claims, a full and complete understanding of the invention may be had by referring to the detailed description of preferred embodiments as set forth hereinafter and as may be seen in the accompanying drawings in which:

DESCRIPTION OF PREFERRED EMBODIMENTS

Figure 1:
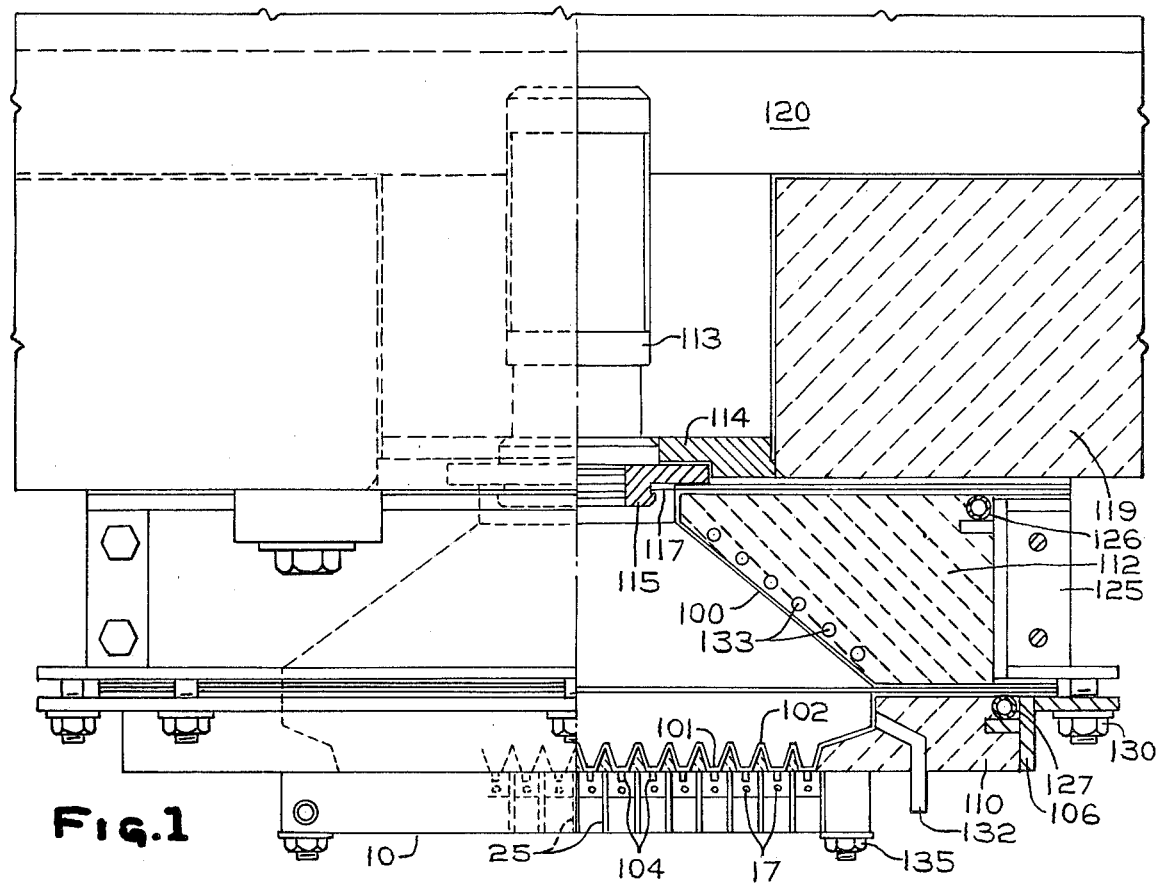
FIG. 1 is a front elevation view, partly in section, and showing the fin cooler assembly of the present invention in place on a bushing which is secured to a forehearth.

Turning initially to FIG. 1, there may be seen a fin cooler assembly, generally at 10, in accordance with the present invention. Fin cooler assembly 10 is secured beneath a corrugated bushing 100 such as is set forth in greater detail in my co-pending application Ser. No. 193,206, filed Oct. 2, 1980. The bushing assembly is provided with a corrugated tip plate having ridges 101 and valleys 102 with the ridges 101 having their crests flattened and being provided with nozzles 104. The bushing 100 is surrounded by a suitable castable refractory 112 and the bushing itself is held in place by a bushing frame 106. The bushing and frame are insulated from each other by a castable refractory 110 in a conventional manner. The flange surrounding the bushing is cooled with a cooling coil 127 and the adaptor flange 125 is similarly cooled with cooling coil 126. Frame 106 is held to adaptor flange 125 by suitable bolts and nuts 130 in a conventional manner. The terminal clamp of the bushing is shown at 132 and suitable heating coils 133 are provided to maintain the glass at a desired temperature as the glass is pumped by pump 113. Pump 113 is located in a recess in the forehearth 119 and pumps the molten glass maintained at 120 to the bushing 100. Pump 113 is supported on a flange 114. A lower cooperating flange 115 is supported by frame member 117 to securely hold pump 113 in place. As indicated previously, this structure is more fully set forth in my co-pending application Ser. No. 193,194, filed Oct. 2, 1980.

Figure 2:
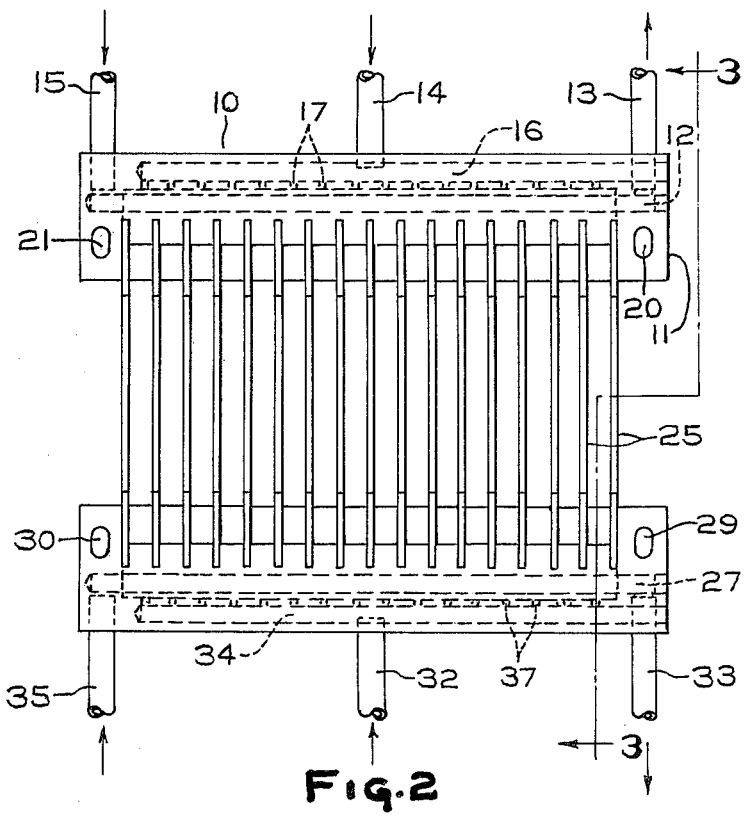
FIG. 2 is a bottom plan view of a first embodiment of a fin cooler in accordance with the present invention.
Figure 3:
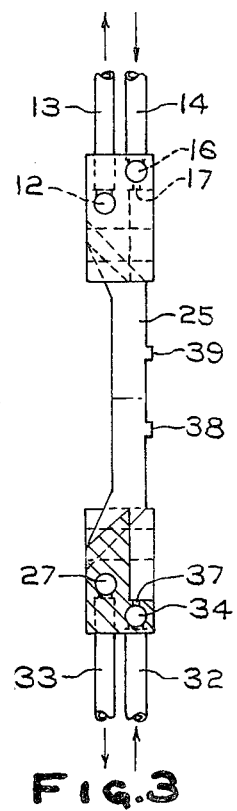
FIG. 3 is an end view of the fin cooler of FIG. 2, taken along line 3—3 of FIG. 2 and partially in cross-section.

Turning again to FIGS. 1, 2 and 3, it may be seen that fin cooler 10 is secured to bushing assembly 100 generally by a plurality of bolts and nuts 135 which extend from the bushing frame and pass through inclined apertures 20, 21, 29 and 30 in fin cooler 10. Fin cooler 10 is comprised of spaced, generally rectangular, manifolds 11 and 11' which are joined by a plurality of elongated fin plates 25. Manifold 11 is provided with a central tubular conduit which extends the length of manifold 11 and which carries cooling water. Conduit 12 has suitable inlet and outlet lines 15 and 13, respectively, for the coolant water or other similar fluid flow. Such coolant conduits are generally known and serve to remove heat collected by the fins 25 away from the nozzles or tips 104 of the bushing 100. Manifold 11' is the mirror image of manifold 11 and is provided with a central tubular conduit 27 and inlet and outlet lines 33 and 35, respectively, for coolant water or other similar fluid flow which functions in the same manner as conduit 12.

Manifold 11 is also provided with an elongated air distribution chamber 16 that is supplied with air or a similar cooling gas at a desired pressure from a suitable source. The air flows into distribution chamber 16 from supply line 14 and is distributed to the areas between the fins 25 by a plurality of orifices or nozzles 17. As may be seen in FIGS. 1 and 3, nozzles 17 are positioned between the elongated fin plates 25 and generally at an upper portion of manifold 11 so they are generally at the level of the nozzles 104. Again, manifold 11' is similarly structured having an air distribution chamber 34, an inlet or supply line 32, and a plurality of spaced outlet nozzles 37 which are positioned like nozzles 17 and function in the same movement.

Figure 4:
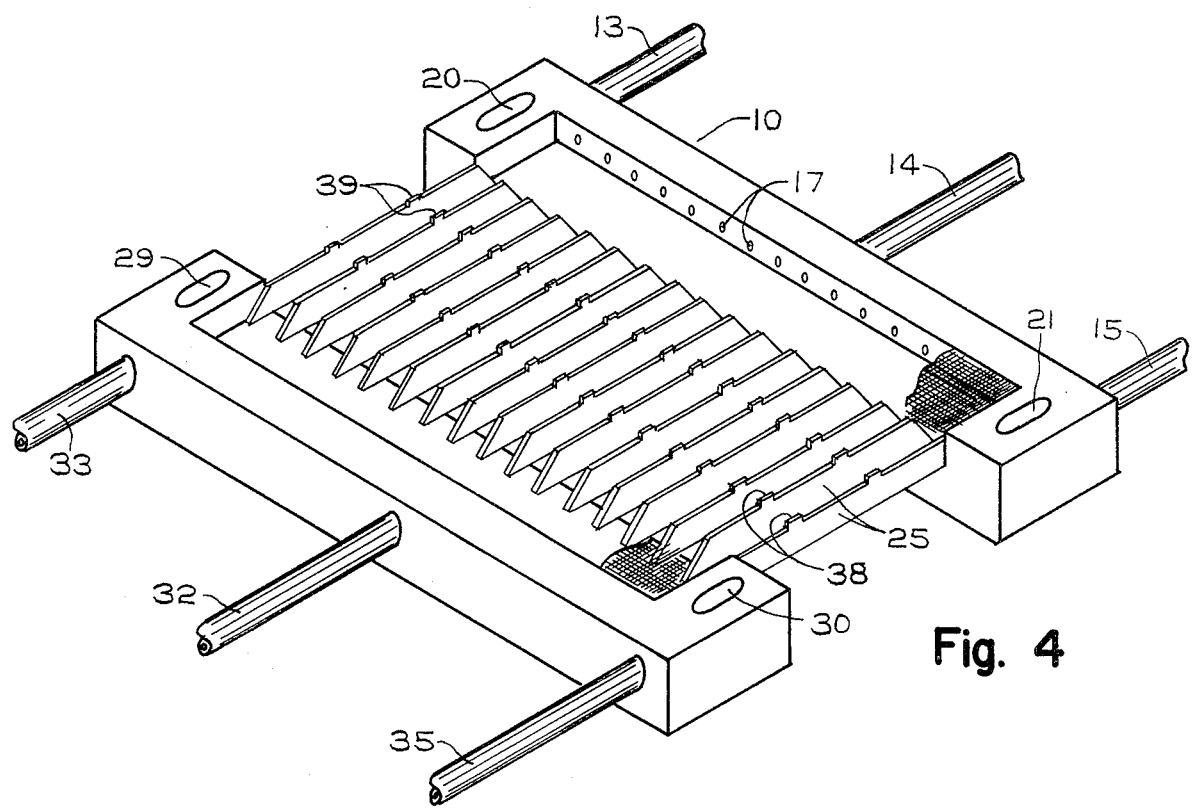
FIG. 4 is a perspective top view of the fin cooler of FIG. 2 with portions removed for clarity.

As may be seen in FIG. 4, each of the generally rectangular manifolds 11 and 11' is provided with a cut-out or recessed area adjacent the outlets for nozzles or orifices 17 and 37, respectively. These recessed areas are filled with a suitable material 40 which disperses the cooling gases as they exit the orifices 17 and 37 to provide even distribution on the gaseous coolant across the area between the elongated flat fins 25. This material 40 may be screening, steel wool, or the like and also provides a filtering action. Thus, the air or other cooling gas which flows from the inlets 14 and 32, through the conduit 16 and 34 in manifolds 11 and 11' and out the nozzles 17 and 37 to the areas between the fins 25 is provided in an even dispersed manner, free of turbulence and having any possible contaminants filtered out.

Figure 5:
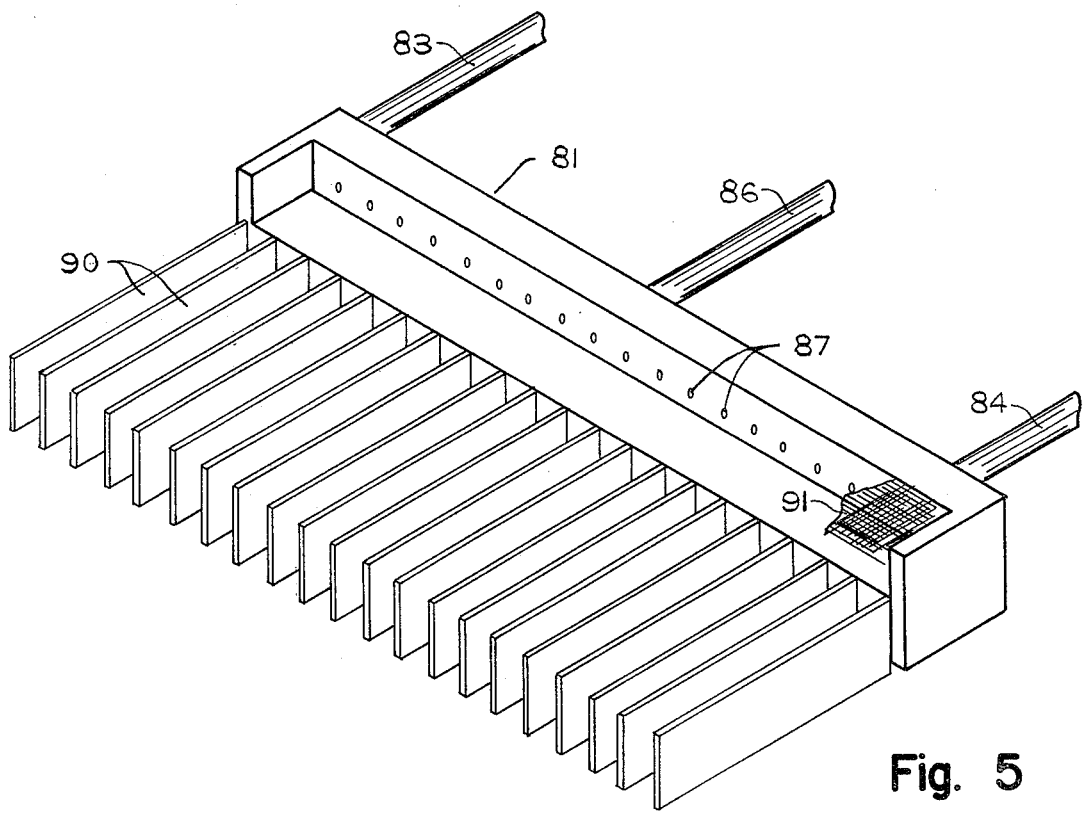
FIG. 5 is a perspective top view of a second embodiment of a fin cooler in accordance with the present invention with portions removed for clarity.

A second embodiment of the fin cooler in accordance with the present invention is shown in FIG. 5. This embodiment is essentially one-half of fin cooler 10 of FIGS. 1 to 4 since only one manifold 81 is provided. The cooling fins 90 are supported by manifold 81 in a cantilever fashion. A central conduit for cooling liquid flow (not shown) is provided and suitable inlet and outlet lines 83 and 84, respectively supply coolant liquid flow. A plurality of air or other coolant gas nozzles 87 are similarly provided and a supply line 86 supplies the air or other gas at a desired pressure. An air disperser and filter 91 is also provided. This second preferred embodiment of a fin cooler is used in a situation where the bushing is smaller and the number of glass fiber tips is not overly large. The fin cooler is readily adaptable to use with a conventional bushing i.e. one operating at low pressure (less than one psi across the tips).

Turning again to FIGS. 3 and 4, it will be noted that each fin 25 is provided with a pair of spaced, upwardly extending projections, 38 and 39. As was discussed in detail in my co-pending application Ser. No. 193,206, filed Oct. 2, 1980, the tip plate of bushing 100 is corrugated and the areas between the nozzles 104 are filled with a castable refractory 103. The upwardly extending projections 38 and 39 can contact this refractory 103 to provide support for the tip plate of the bushing whereby creep and sag of the tip plate will be substantially reduced. Alternatively, the entire top surface of the fin plates could be brought into contact with the refractory 103, as would be the situation if fin plates 90 without projections, as seen in the second preferred embodiment of FIG. 5, were used. Contact of only the projections 38 and 39 with the castable material 103 is the preferred embodiment since it results in less localized heat loss from the tip plate to the fins thereby facilitating maintenance of the tip plate at a desired temperature.

In operation, the glass in the forehearth 119 is pumped by pump 113 into the bushing 100 where it exits through the tips 104 in the form of numerous filaments that are sized and gathered into strand and collected by winding on a winder. Since the glass is delivered at an elevated pressure, for example, in the range of 5 to 25 psig or higher, less tension is required to produce thin filaments. The manifold 81 or manifolds 11 and 11' take heat away from the fins 25 by use of water or other coolant liquid flow, in a conventional manner. The fins also assist in supporting the tip plate to prevent creep or sag of the tip plate. Where the operation of the winder is stopped such as would be required to remove a finished package or in case of mechanical breakdown, or at any time when additional cooling is desired, the coolant air flow through the orifices 17 and 37 or 87 can be started or increased to provide the additional cooling needed. Thus, the tip plate temperature need not be reduced during shutdown and the bushing will be able to be quickly returned to service.

While the preferred embodiments of a fin cooler in accordance with the present invention have been hereinabove fully and completely described, it will be obvious to one of ordinary skill in the art that a number of changes in, for example, the shape of the manifolds, the number of fins, the type of air disperser used, the type of bushing used and the like could be made without departing from the true spirit and scope of the present invention and that the invention is to be limited only by the following claims.

I claim:

1. A fin cooler for a bushing used in a glass fiber forming assembly in which the bushing is provided with a tip plate having a plurality of glass fibers forming orifices, the orifices being arranged in a spaced array, said fin cooler being positionable below the bushing to cool the glass fibers emanating from the orifices of the bushing; said fin cooler comprising at least a first manifold, a plurality of spaced elongated cooling fins, each cooling fin having a first end secured to said manifold and extending away from said manifold, said cooling fins being parallel to each other and adjacent said glass fiber forming tips when said fin cooler is positioned adjacent the bushing; a conduit in said manifold for flowing liquid coolant through said manifold to remove heat from said fins; a coolant gas distribution chamber in said manifold, said chamber being provided with a plurality of openings along its length, said openings being positioned so that gas fed to said chamber flows from the chamber through the orifices to the parallel fins and means on said fins for contacting the tip plate of the bushing to support said tip plate.

2. The fin cooler of claim 1 wherein the glass fiber forming assembly includes means for supplying the glass to the tip plate at an elevated pressure, and said means on said fins supporting the tip plate prevents deformation of the tip plate.

3. The fin cooler of claim 1 further comprising a second manifold, said second manifold being spaced from said first manifold, second ends of said fins being secured to said second manifold.

4. The fin cooler of claim 1 or 3 wherein said manifold further comprises gas dispersing means, said gas dispersing means being positioned adjacent said means to distribute said gas between said fins.

5. The fin cooler of claim 1 or 3 further wherein said cooling fins are flat elongated blades, said means on said fins contacting the tip plate being spaced upwardly extending projections.

6. The fin cooler of claim 5 wherein there are at least two of said spaced upwardly extending projections on each of said fins.

* * * * *